(12) United States Patent
Allen (10) Patent No.: US 12,458,379 B2
(45) Date of Patent: Nov. 4, 2025

(54) METHOD FOR THE TREATMENT OF THROMBOEMBOLISM

(71) Applicant: EKOS CORPORATION, Bothell, WA (US)

(72) Inventor: Lynn Gourley Allen, Edmonds, WA (US)

(73) Assignee: BOSTON SCIENTIFIC SCIMED, INC., Maple Grove, MN (US)

(*) Notice: Subject to any disclaimer, the term of this patent is extended or adjusted under 35 U.S.C. 154(b) by 1849 days.

(21) Appl. No.: 15/878,269

(22) Filed: Jan. 23, 2018

(65) Prior Publication Data

US 2018/0206867 A1  Jul. 26, 2018

Related U.S. Application Data

(60) Provisional application No. 62/449,966, filed on Jan. 24, 2017.

(51) Int. Cl.
| | | |
|---|---|---|
| A61B 17/22 | (2006.01) | |
| A61K 38/00 | (2006.01) | |
| A61K 38/48 | (2006.01) | |
| A61M 37/00 | (2006.01) | |
| A61P 7/02 | (2006.01) | |

(52) U.S. Cl.
CPC .......... *A61B 17/2202* (2013.01); *A61K 38/00* (2013.01); *A61K 38/482* (2013.01); *A61M 37/0092* (2013.01); *A61P 7/02* (2018.01); *A61B 2017/22084* (2013.01); *A61B 2017/22088* (2013.01)

(58) Field of Classification Search
CPC .... A61B 2017/22014; A61B 17/22004; A61B 17/22012; A61B 17/22; A61B 2017/22082; A61B 17/2202; A61B 2017/22084; A61B 2017/22088; A61M 37/0092; A61M 2205/058
See application file for complete search history.

(56) References Cited

U.S. PATENT DOCUMENTS

| | | |
|---|---|---|
| 3,352,303 A | 11/1967 | Delaney |
| 3,430,625 A | 3/1969 | McLeod, Jr. |
| 3,565,062 A | 2/1971 | Kuris |

(Continued)

FOREIGN PATENT DOCUMENTS

| | | |
|---|---|---|
| EP | 0 744 189 | 11/1996 |
| EP | 1 090 658 | 4/2001 |

(Continued)

OTHER PUBLICATIONS

Engelberger et al., "Ultrsound-assisted thrombolysis for acute pulmonary embolism: a systematic review," European Heart Journal, 35: 758-764, 2014.

(Continued)

*Primary Examiner* — Jason E Flick
(74) *Attorney, Agent, or Firm* — Seager, Tufte & Wickhem, LLP (57) ABSTRACT

A method for the treatment of thromboembolism comprising administering a thrombolytic agent directly to the thromboembolism in the presence of ultrasound. The total dose of thrombolytic agent administered is between 1 and 12 mg and the time over which the total dose is delivered is less than 15 hours.

20 Claims, 4 Drawing Sheets

(56) References Cited

U.S. PATENT DOCUMENTS

| | | |
|---|---|---|
| 3,827,115 A | 8/1974 | Bom |
| 3,861,391 A | 1/1975 | Antonevich et al. |
| 3,941,122 A | 3/1976 | Jones |
| 4,192,294 A | 3/1980 | Vasilevsky et al. |
| 4,309,989 A | 1/1982 | Fahim |
| 4,319,580 A | 3/1982 | Colley et al. |
| 4,354,502 A | 10/1982 | Colley et al. |
| 4,682,596 A | 7/1987 | Bales et al. |
| 4,692,139 A | 9/1987 | Stiles |
| 4,808,153 A | 2/1989 | Parisi |
| 4,870,953 A | 10/1989 | DonMicheal et al. |
| 4,936,281 A | 6/1990 | Stasz |
| 4,953,565 A | 9/1990 | Tachibana et al. |
| 4,971,991 A | 11/1990 | Umemura et al. |
| 5,058,570 A | 10/1991 | Idemoto et al. |
| 5,069,664 A | 12/1991 | Guess |
| 5,076,276 A | 12/1991 | Sakurai et al. |
| 5,088,499 A | 2/1992 | Unger |
| 5,163,421 A | 11/1992 | Bernstein et al. |
| 5,163,436 A | 11/1992 | Saitoh et al. |
| 5,197,946 A | 3/1993 | Tachibana |
| 5,267,954 A | 12/1993 | Nita |
| 5,269,291 A | 12/1993 | Carter |
| 5,279,546 A | 1/1994 | Mische et al. |
| 5,304,115 A | 4/1994 | Pflueger |
| 5,307,816 A | 5/1994 | Hashimoto |
| 5,315,998 A | 5/1994 | Tachibana et al. |
| 5,318,014 A | 6/1994 | Carter |
| 5,326,342 A | 7/1994 | Pflueger |
| 5,342,292 A | 8/1994 | Nita et al. |
| 5,344,395 A | 9/1994 | Whalen et al. |
| 5,345,940 A | 9/1994 | Seward |
| 5,362,309 A | 11/1994 | Carter |
| 5,368,557 A | 11/1994 | Nita |
| 5,368,558 A | 11/1994 | Nita |
| 5,380,273 A | 1/1995 | Dubrul et al. |
| 5,399,158 A * | 3/1995 | Lauer ............... A61B 17/22004 601/2 |
| 5,401,237 A | 3/1995 | Tachibana et al. |
| 5,423,797 A | 6/1995 | Adrian et al. |
| 5,431,663 A | 7/1995 | Carter |
| 5,440,914 A | 8/1995 | Tachibana et al. |
| 5,447,509 A | 9/1995 | Mills et al. |
| 5,456,259 A | 10/1995 | Barlow et al. |
| 5,474,530 A | 12/1995 | Passafaro |
| 5,474,531 A | 12/1995 | Carter |
| 5,498,236 A | 3/1996 | Dubrul et al. |
| 5,509,896 A | 4/1996 | Carter |
| 5,542,917 A | 8/1996 | Nita et al. |
| 5,542,935 A | 8/1996 | Unger et al. |
| 5,558,092 A | 9/1996 | Unger et al. |
| 5,582,586 A | 12/1996 | Tachibana et al. |
| 5,603,327 A | 2/1997 | Eberle |
| 5,606,974 A | 3/1997 | Castellano |
| 5,620,409 A | 4/1997 | Gans et al. |
| 5,624,382 A | 4/1997 | Oppelt |
| 5,648,098 A | 7/1997 | Porter |
| 5,660,909 A | 8/1997 | Tachibana et al. |
| 5,681,296 A | 10/1997 | Ishida |
| 5,695,460 A | 12/1997 | Siegel et al. |
| 5,720,710 A | 2/1998 | Tachibana et al. |
| 5,724,976 A | 3/1998 | Hirama et al. |
| 5,725,494 A | 3/1998 | Brisken |
| 5,728,062 A | 3/1998 | Brisken |
| 5,752,930 A | 5/1998 | Baudino et al. |
| 5,823,962 A | 10/1998 | Lerch et al. |
| 5,827,203 A | 10/1998 | Nita |
| 5,834,880 A | 11/1998 | Lewandowski et al. |
| 5,840,031 A | 11/1998 | Crowley |
| 5,846,218 A | 12/1998 | Brisken et al. |
| 5,876,345 A | 3/1999 | Eaton et al. |
| 5,925,016 A | 7/1999 | Chornenky et al. |
| 5,928,186 A | 7/1999 | Homsma et al. |
| 5,934,284 A | 8/1999 | Plaia et al. |
| 5,945,432 A * | 8/1999 | Bednar ............... A61K 38/49 514/579 |
| 5,957,851 A | 9/1999 | Hossack |
| 5,957,882 A | 9/1999 | Nita et al. |
| 5,971,949 A | 10/1999 | Levin et al. |
| 5,976,120 A | 11/1999 | Chow et al. |
| 5,997,497 A | 12/1999 | Nita et al. |
| 6,001,069 A | 12/1999 | Tachibana et al. |
| 6,024,718 A | 2/2000 | Chen et al. |
| 6,063,069 A | 5/2000 | Cragg et al. |
| 6,066,123 A | 5/2000 | Bednarski et al. |
| 6,088,613 A | 7/2000 | Unger |
| 6,089,573 A | 7/2000 | Udagawa |
| 6,113,570 A | 9/2000 | Siegel et al. |
| 6,117,101 A | 9/2000 | Diederich et al. |
| 6,135,976 A | 10/2000 | Tachibana et al. |
| 6,149,596 A | 11/2000 | Bancroft |
| 6,176,842 B1 | 1/2001 | Tachibana et al. |
| 6,206,831 B1 | 3/2001 | Suorsa et al. |
| 6,210,356 B1 | 4/2001 | Anderson et al. |
| 6,210,393 B1 | 4/2001 | Brisken |
| 6,221,038 B1 | 4/2001 | Brisken |
| 6,228,046 B1 | 5/2001 | Brisken |
| 6,235,024 B1 | 5/2001 | Tu |
| 6,238,347 B1 | 5/2001 | Nix et al. |
| 6,270,460 B1 | 8/2001 | McCartan et al. |
| 6,277,077 B1 | 8/2001 | Brisken et al. |
| 6,287,271 B1 | 9/2001 | Dubrul et al. |
| 6,296,619 B1 | 10/2001 | Brisken et al. |
| 6,312,402 B1 | 11/2001 | Hansmann |
| 6,361,554 B1 | 3/2002 | Brisken |
| 6,391,042 B1 | 5/2002 | Cimino |
| 6,394,956 B1 | 5/2002 | Chandrasekaran et al. |
| 6,398,772 B1 | 6/2002 | Bond et al. |
| 6,398,792 B1 | 6/2002 | O'Connor |
| 6,416,740 B1 | 7/2002 | Unger |
| 6,454,737 B1 | 9/2002 | Nita et al. |
| 6,454,757 B1 | 9/2002 | Nita et al. |
| 6,464,680 B1 | 10/2002 | Brisken et al. |
| 6,471,683 B2 | 10/2002 | Drasier et al. |
| 6,478,765 B2 | 11/2002 | Siegel et al. |
| 6,494,891 B1 | 12/2002 | Cornish et al. |
| 6,506,584 B1 | 1/2003 | Chandler et al. |
| 6,524,251 B2 | 2/2003 | Rabiner et al. |
| 6,524,271 B2 | 2/2003 | Brisken et al. |
| 6,551,337 B1 | 4/2003 | Rabiner et al. |
| 6,558,366 B1 | 5/2003 | Drasler et al. |
| 6,562,021 B1 | 5/2003 | Derbin et al. |
| 6,565,552 B1 | 5/2003 | Barbut |
| 6,575,956 B1 | 6/2003 | Brisken et al. |
| 6,579,277 B1 | 6/2003 | Rabiner et al. |
| 6,582,392 B1 | 6/2003 | Bennett et al. |
| 6,589,253 B1 | 7/2003 | Cornish et al. |
| 6,605,084 B2 | 8/2003 | Acker et al. |
| 6,623,444 B2 | 9/2003 | Babaev |
| 6,635,046 B1 | 10/2003 | Barbut |
| 6,645,150 B2 | 11/2003 | Angelsen et al. |
| 6,647,755 B2 | 11/2003 | Rabiner et al. |
| 6,652,547 B2 | 11/2003 | Rabiner et al. |
| 6,660,013 B2 | 12/2003 | Rabiner et al. |
| 6,663,613 B1 | 12/2003 | Evans et al. |
| 6,676,626 B1 | 1/2004 | Bennett et al. |
| 6,682,502 B2 | 1/2004 | Bond et al. |
| 6,689,086 B1 | 2/2004 | Nita et al. |
| 6,695,781 B2 | 2/2004 | Rabiner et al. |
| 6,695,782 B2 | 2/2004 | Ranucci et al. |
| 6,695,785 B2 | 2/2004 | Brisken et al. |
| 6,723,063 B1 | 4/2004 | Zhang et al. |
| 6,723,064 B2 | 4/2004 | Babaev |
| 6,726,698 B2 | 4/2004 | Cimino |
| 6,730,048 B1 | 5/2004 | Hare et al. |
| 6,733,451 B2 | 5/2004 | Rabiner et al. |
| 6,740,040 B1 | 5/2004 | Mandrusov et al. |
| 6,767,345 B2 | 7/2004 | St. Germain et al. |
| 6,824,575 B1 | 11/2004 | Otomo et al. |
| 6,830,577 B2 | 12/2004 | Nash et al. |
| 6,849,062 B2 | 2/2005 | Kantor |
| 6,855,123 B2 | 2/2005 | Nita |
| 6,866,670 B2 | 3/2005 | Rabiner et al. |

(56) References Cited

U.S. PATENT DOCUMENTS

| | | |
|---|---|---|
| 6,905,505 B2 | 6/2005 | Dodson, Jr. et al. |
| 6,921,371 B2 | 7/2005 | Wilson |
| 6,929,633 B2 | 8/2005 | Evans et al. |
| 6,942,620 B2 | 9/2005 | Nita et al. |
| 6,942,677 B2 | 9/2005 | Nita et al. |
| 6,945,937 B2 | 9/2005 | Culp et al. |
| 6,958,040 B2 | 10/2005 | Oliver |
| 6,979,293 B2 | 12/2005 | Hansmann et al. |
| 6,985,771 B2 | 1/2006 | Fischell et al. |
| 7,137,963 B2 | 11/2006 | Nita et al. |
| 7,141,044 B2 | 11/2006 | Gentsler |
| 7,166,098 B1 | 1/2007 | Steward et al. |
| 7,186,246 B2 | 3/2007 | Bennett et al. |
| 7,220,233 B2 | 5/2007 | Nita et al. |
| 7,220,239 B2 | 5/2007 | Wilson et al. |
| 7,309,334 B2 | 12/2007 | von Hoffmann |
| 7,335,180 B2 | 2/2008 | Nita et al. |
| 7,341,569 B2 | 3/2008 | Soltani et al. |
| 7,384,407 B2 | 6/2008 | Rodriguez et al. |
| 7,503,895 B2 | 3/2009 | Rabiner et al. |
| 7,540,852 B2 | 6/2009 | Nita et al. |
| 7,567,016 B2 | 7/2009 | Lu et al. |
| 7,604,608 B2 | 10/2009 | Nita et al. |
| 7,621,902 B2 | 11/2009 | Nita et al. |
| 7,621,929 B2 | 11/2009 | Nita et al. |
| 7,648,478 B2 | 1/2010 | Soltani et al. |
| 7,727,178 B2 | 6/2010 | Wilson |
| 7,758,509 B2 | 7/2010 | Angelsen et al. |
| 7,771,372 B2 | 8/2010 | Wilson |
| 7,774,933 B2 | 8/2010 | Wilson et al. |
| 7,789,830 B2 | 9/2010 | Fujita et al. |
| 7,818,854 B2 | 10/2010 | Wilson |
| 7,828,754 B2 | 11/2010 | Abe et al. |
| 7,828,762 B2 | 11/2010 | Wilson |
| 7,901,359 B2 | 3/2011 | Mandrusov et al. |
| 7,914,509 B2 | 3/2011 | Bennett et al. |
| 8,012,092 B2 | 9/2011 | Powers et al. |
| 8,062,566 B2 | 11/2011 | Nita et al. |
| 8,123,789 B2 | 2/2012 | Khanna |
| 8,152,753 B2 | 4/2012 | Nita et al. |
| 8,167,831 B2 | 5/2012 | Wilson |
| 8,192,363 B2 | 6/2012 | Soltani et al. |
| 8,696,612 B2 | 4/2014 | Wilson et al. |
| 8,740,835 B2 | 6/2014 | Soltani et al. |
| 9,044,568 B2 | 6/2015 | Wilcox et al. |
| 9,107,590 B2 | 8/2015 | Hansmann et al. |
| 9,192,566 B2 | 11/2015 | Soltani et al. |
| 2002/0032394 A1 | 3/2002 | Brisken et al. |
| 2002/0045890 A1 | 4/2002 | Celliers et al. |
| 2002/0052620 A1 | 5/2002 | Barbut |
| 2002/0068869 A1 | 6/2002 | Brisken et al. |
| 2002/0077550 A1 | 6/2002 | Rabiner et al. |
| 2002/0082238 A1 | 6/2002 | Newman et al. |
| 2002/0123787 A1 | 9/2002 | Weiss |
| 2002/0193708 A1 | 12/2002 | Thompson et al. |
| 2003/0036705 A1 | 2/2003 | Hare et al. |
| 2003/0040501 A1 | 2/2003 | Newman et al. |
| 2003/0050662 A1 | 3/2003 | Don Michael |
| 2003/0065263 A1 | 4/2003 | Hare et al. |
| 2003/0069525 A1 | 4/2003 | Brisken et al. |
| 2003/0083608 A1 | 5/2003 | Evans et al. |
| 2003/0163147 A1 | 8/2003 | Hare et al. |
| 2003/0236539 A1 | 12/2003 | Rabiner et al. |
| 2004/0001809 A1 | 1/2004 | Brisken et al. |
| 2004/0019318 A1 | 1/2004 | Wilson et al. |
| 2004/0039311 A1 | 2/2004 | Nita et al. |
| 2004/0049148 A1 | 3/2004 | Rodriguez et al. |
| 2004/0059313 A1 | 3/2004 | Anderson et al. |
| 2004/0068189 A1 | 4/2004 | Wilson et al. |
| 2004/0097996 A1 | 5/2004 | Hare et al. |
| 2004/0138570 A1 | 7/2004 | Nita et al. |
| 2004/0162571 A1 | 8/2004 | Rabiner et al. |
| 2004/0171981 A1 | 9/2004 | Buffen et al. |
| 2004/0220514 A1 | 11/2004 | Cafferata |
| 2004/0236350 A1 | 11/2004 | Bolduc et al. |
| 2004/0255957 A1 | 12/2004 | Cafferata |
| 2004/0265393 A1 | 12/2004 | Unger et al. |
| 2005/0021063 A1 | 1/2005 | Hall et al. |
| 2005/0043629 A1 | 2/2005 | Rabiner et al. |
| 2005/0043753 A1 | 2/2005 | Rabiner et al. |
| 2005/0096669 A1 | 5/2005 | Rabiner et al. |
| 2005/0113688 A1 | 5/2005 | Nita et al. |
| 2005/0119679 A1 | 6/2005 | Rabiner et al. |
| 2005/0124877 A1 | 6/2005 | Nita et al. |
| 2005/0137520 A1 | 6/2005 | Rule et al. |
| 2005/0187513 A1 | 8/2005 | Rabiner et al. |
| 2005/0187514 A1 | 8/2005 | Rabiner et al. |
| 2005/0197619 A1 | 9/2005 | Rule et al. |
| 2005/0209578 A1 | 9/2005 | Christian Evans et al. |
| 2005/0215942 A1 | 9/2005 | Abrahamson et al. |
| 2005/0216044 A1 | 9/2005 | Hong |
| 2005/0256410 A1 | 11/2005 | Rabiner et al. |
| 2006/0069303 A1 | 3/2006 | Couvillon |
| 2006/0106308 A1 | 5/2006 | Hansmann et al. |
| 2006/0173387 A1 | 8/2006 | Hansmann et al. |
| 2006/0184070 A1 | 8/2006 | Hansmann et al. |
| 2007/0037119 A1 | 2/2007 | Pal et al. |
| 2007/0038158 A1 | 2/2007 | Nita et al. |
| 2007/0066978 A1 | 3/2007 | Schafer et al. |
| 2007/0225619 A1 | 9/2007 | Rabiner et al. |
| 2007/0239027 A1 | 10/2007 | Nita |
| 2007/0265560 A1 | 11/2007 | Soltani et al. |
| 2008/0045865 A1 | 2/2008 | Kislev |
| 2008/0065014 A1 | 3/2008 | McCrystle et al. |
| 2008/0146918 A1 | 6/2008 | Magnin et al. |
| 2008/0154181 A1 | 6/2008 | Khanna |
| 2008/0167602 A1 | 7/2008 | Nita et al. |
| 2008/0171965 A1 | 7/2008 | Soltani et al. |
| 2008/0172067 A1 | 7/2008 | Nita et al. |
| 2008/0194954 A1 | 8/2008 | Matsunaga et al. |
| 2008/0221506 A1 | 9/2008 | Rodriguez et al. |
| 2008/0262350 A1 | 10/2008 | Unger |
| 2008/0306499 A1 | 12/2008 | Katoh et al. |
| 2008/0319355 A1 | 12/2008 | Nita |
| 2009/0018472 A1 | 1/2009 | Soltani et al. |
| 2009/0112150 A1 | 4/2009 | Unger et al. |
| 2009/0209900 A1 | 8/2009 | Carmeli et al. |
| 2009/0216246 A1 | 8/2009 | Nita et al. |
| 2010/0010393 A1 | 1/2010 | Duffy et al. |
| 2010/0022920 A1 | 1/2010 | Nita et al. |
| 2010/0022944 A1 | 1/2010 | Wilcox |
| 2010/0023036 A1 | 1/2010 | Nita et al. |
| 2010/0023037 A1 | 1/2010 | Nita et al. |
| 2010/0049209 A1 | 2/2010 | Nita et al. |
| 2010/0063413 A1 | 3/2010 | Volz |
| 2010/0063414 A1 | 3/2010 | Volz |
| 2010/0081934 A1 | 4/2010 | Hansmann et al. |
| 2010/0204582 A1 | 8/2010 | Lu |
| 2010/0210940 A1 | 8/2010 | Bradley et al. |
| 2010/0222715 A1 | 9/2010 | Nita |
| 2010/0256616 A1 | 10/2010 | Katoh et al. |
| 2010/0262215 A1 | 10/2010 | Gertner |
| 2010/0292685 A1 | 11/2010 | Katoh et al. |
| 2011/0082396 A1 | 4/2011 | Wallace |
| 2011/0160621 A1 | 6/2011 | Nita |
| 2011/0288449 A1 | 11/2011 | Schenkengel |
| 2011/0313328 A1 | 12/2011 | Nita |
| 2011/0319927 A1 | 12/2011 | Nita |
| 2012/0016272 A1 | 1/2012 | Nita et al. |
| 2012/0041307 A1 | 2/2012 | Patel et al. |
| 2012/0059285 A1 | 3/2012 | Soltani et al. |
| 2012/0078140 A1 | 3/2012 | Nita |
| 2012/0123273 A1 | 5/2012 | Okuno et al. |
| 2012/0179073 A1 | 7/2012 | Nita |
| 2012/0197277 A1 | 8/2012 | Stinis |
| 2012/0289889 A1* | 11/2012 | Genstler ............ A61B 17/2202 604/22 |

FOREIGN PATENT DOCUMENTS

| | | |
|---|---|---|
| JP | 2012513292 A | 6/2012 |
| WO | 9509572 A1 | 4/1995 |
| WO | WO 96/027341 | 9/1996 |
| WO | WO 96/029935 | 10/1996 |

(56) References Cited

FOREIGN PATENT DOCUMENTS

| WO | WO 96/036286 | 11/1996 |
|---|---|---|
| WO | WO 99/033500 | 7/1999 |
| WO | WO 99/039647 | 8/1999 |
| WO | WO 00/038580 | 7/2000 |
| WO | WO 02/013678 | 2/2002 |
| WO | WO 02/015803 | 2/2002 |
| WO | WO 02/015804 | 2/2002 |
| WO | WO 03/051208 | 6/2003 |
| WO | WO 2005/027756 | 3/2005 |
| WO | WO 2005/084552 | 9/2005 |
| WO | WO 2005/084553 | 9/2005 |
| WO | WO 2008/086372 | 7/2008 |

OTHER PUBLICATIONS

Chamsuddin et al., "Catheter-directed Thrombolysis with the Endowave System in the Treatment of Acute Massive Pulmonary Embolism: A Retrospective Multicenter Case Series," Journal of Vascular and Interventional Radiology, Mar. 2008, vol. 19, No. 3, pp. 372-376.

Frémont et al., "Prognostic Value of Echocardiographic Right/Left Ventricular End-Diastolic DiameterRatio in Patients With Acute Pulmonary Embolism: Results From a Monocenter Registry of 1,416 Patients", Chest, Feb. 2008, vol. 133, No. 2, pp. 358-362.

Jaff et al., "Management of Massive and Submassive Pulmonary Embolism, Iliofemoral Deep Vein Thrombosis, and Chronic Thromboembolic Pulmonary Hypertension: A Scientific Statement From the American Heart Association", Challenging Forms of Venous Thromboembolic Disease, Circulation, 2011, vol. 123, pp. 1788-1830.

Kucher et al., "Randomized, Controlled Trial of Ultrasound-Assisted Catheter-Directed Thrombolysis for Acute Intermediate-Risk Pulmonary Embolism", Ultrasound Thrombolysis for Pulmonary Embolism, Circulation, 2014, vol. 129, pp. 479-486.

Lin et al., "Comparison of Percutaneous Ultrasound-Accelerated Thrombolysis versus Catheter-Directed Thrombolysis in Patients with Acute Massive Pulmonary Embolism," Vascular, 2009, vol. 17, No. 3, pp. S137-S147.

Meyer et al., "Fibrinolysis for Patients with Intermediate-Risk Pulmonary Embolism", N. Engl, J. Med., 2014, vol. 340, pp. 1402-1411.

Kucher Nils et al. "Randomized, controlled trial of ultrasound-assisted catheter-directed thrombolysis for acute Intermediate-risk pulmonary embolism." Circulation vol. 129,4 (2014): 479-86. doi:10.1161/CIRCULATIONAHA.113.005544.

"The Japan Society of Ultrasonics in Medicine 50th Anniversary, 2013, 140-141"; cited as D4 in the Sep. 13, 2022 Office Action for Japanese patent application No. 2019-539808 [2001.2137371].

Sep. 16, 2022 Reporting letter from Japanese Associate forwarding Sep. 13, 2022 Office Action.

Oct. 14, 2022 Reporting letter from Japanese Associate forwarding English translation summary of the Sep. 13, 2022 Japanese Office Action.

English translation summary of the Sep. 13, 2022 Japanese Office Action, referencing and characterizing the D4 reference.

English translation of pending claims for Japanese patent application No. 2019-539808 [2001.2137371].

Thrombolytic Agent (rt-PA Formulation) Alteplase (Genetically Recombinant) for Intravenous Use: AcubactisinR Injection 6 Million, AcubactisinR Injection 12 Million, AcubactisinR Injection 24 Million, Package Insert, (Published 1991) (Revised May 2024) (Original Document; English Translation Not Available; 6 pgs).

Fibrinolytic Enzyme Agent: Urokinase-Urokinase for Intravenous Use 60,000 Units, Package Insert, (Published 1985) (Revised Aug. 2024) (Original Document; English Translation Not Available; 3 pgs).

* cited by examiner

METHOD FOR THE TREATMENT OF THROMBOEMBOLISM

INCORPORATION BY REFERENCE TO ANY PRIORITY APPLICATIONS

The present application claims the benefit of U.S. Provisional Application No. 62/449,966, filed Jan. 24, 2017, the contents of which are hereby incorporated by reference in its entirety.

DETAILED DESCRIPTION

This invention relates to methods for treating the effects of thromboembolism, and for the thrombolytic treatment of blood clots, including those associated with Deep Vein Thrombosis (DVT), Pulmonary Embolism (PE) and Peripheral Arterial Occlusions (PAO). The methods of the invention enable loco-regional treatment of thrombus, resulting in improvement of symptoms and clot lysis, using reduced doses of thrombolytic agents and reduced treatment times.

Thromboembolism occurs when thrombus is formed within a blood vessel to the extent that the blood vessel becomes blocked. The impact of a blocked blood vessel can be serious and even life-threatening depending on the location of the blockage. For example, thrombus formation in (typically atherosclerotic) arteries can lead to peripheral arterial disease. When thrombus forms in the coronary arteries, myocardial infarction can result and thrombus in the cerebral arteries can cause ischaemic stroke. Venous thrombosis commonly occurs when thrombus forms and blocks flow in the deep veins of the leg, resulting in Deep Vein Thrombosis (DVT). Thrombus which travels through the venous system to the lungs causes Pulmonary Embolism (PE) which, in the most severe cases, can lead to sudden death. Often, but not exclusively, PE results when a part of the thrombus causing DVT breaks off and travels to the lungs.

There is evidence that incidence of thromboembolism and, in particular, venous thromboembolism is increasing. The 2008 United States Surgeon General's Call to Action to Prevent DVT and PE estimates that 100,000 to 180,000 deaths occur annually from PE in the USA alone. The majority of deaths from acute PE result from right ventricular (RV) pressure overload and subsequent heart failure. Right ventricular dysfunction is commonly measured in terms of the right ventricular/left ventricular diameter ratio (RV/LV ratio). An RV/LV ratio which is greater than or equal to 0.9 is an independent predictive factor for mortality in PE patients, and the risk of adverse events, including death, increases as RV/LV ratio increases above 1.0 (Fremont et al, *CHEST* 2008; 133: 358-362).

Figure 1:
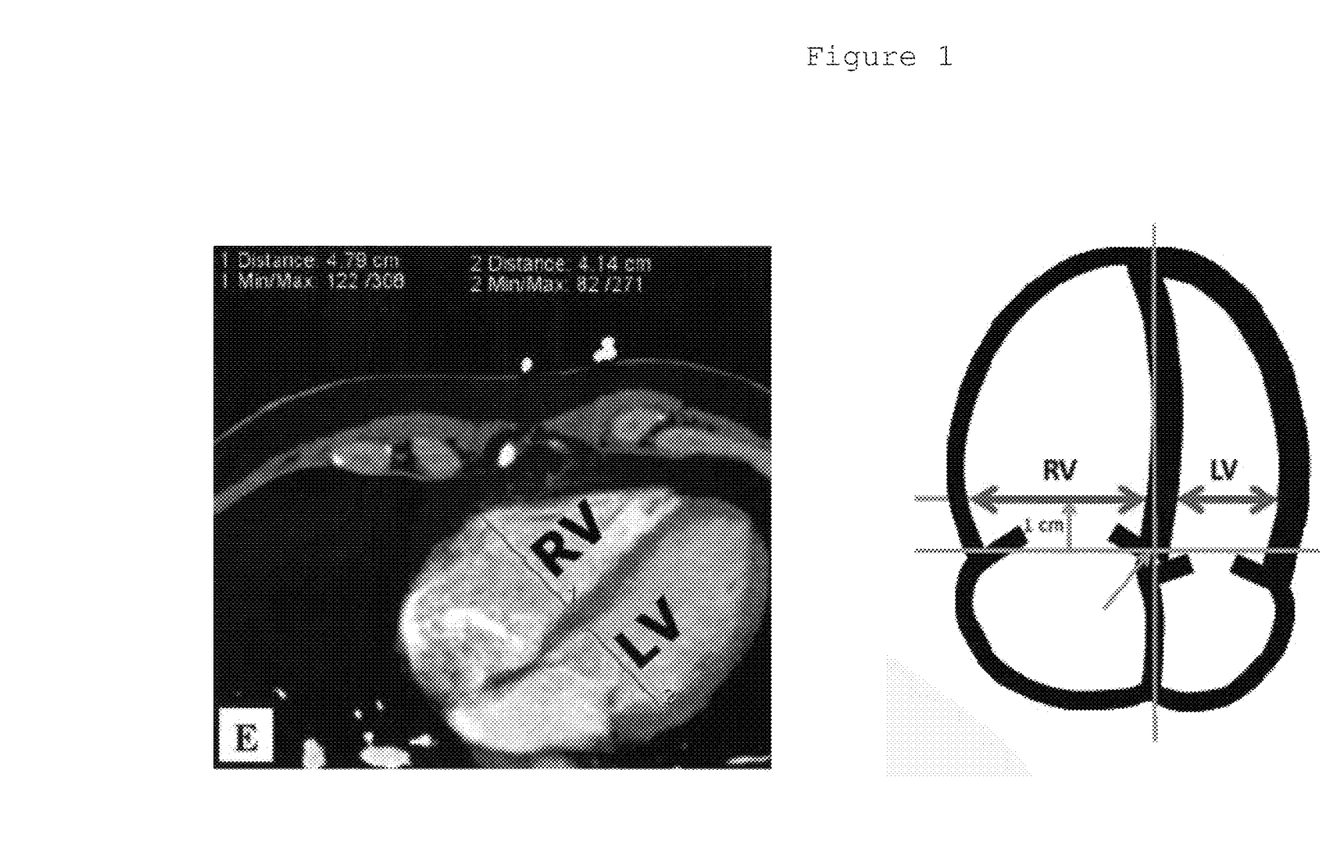
FIG. 1 illustrates a colored example measurement of an RV/LV ratio measured as the apical 4-chamber RV diameter divided by LV diameter, as measured from a computed tomography (CT) angiogram taken to create a 4 chamber view.
Figure 1A:
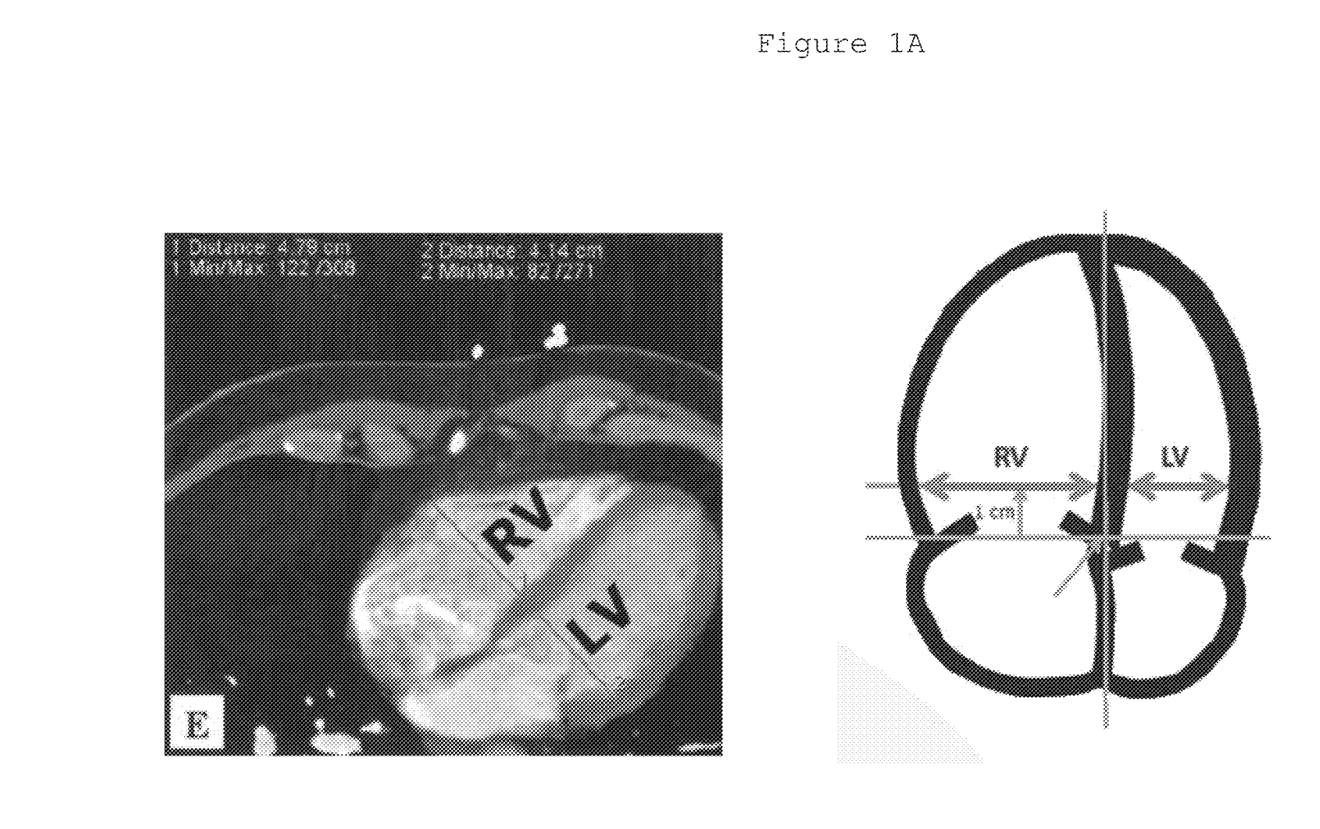
FIG. 1A illustrates a black and white version of the colored example illustrated in FIG. 1.

RV/LV ratios are typically measured as the apical 4-chamber RV diameter divided by LV diameter, as measured from a computed tomography (CT) angiogram taken to create a 4 chamber view. For example, a CT is arranged to capture an apical 4-chamber view and the end diastolic image is recorded. A center line is drawn through the interventricular septum and another line is drawn through the tricuspid annular line to create a cross. A sub-annular line is drawn 1 cm above the annular line. The right ventricular diameter is measured as the distance between the centre line and the endocardial border of the right ventricle, and the left ventricular diameter is measured as the distance between the center line and the endocardial border of the left ventricle. An example measurement is included in two versions in the drawings—FIG. 1 in color and FIG. 1A in black and white. The person skilled in the art will understand that there are other methods for determining RV/LV ratio (such as maximum ventricular diameters on a apical 4-chamber view) and also that RV/LV ratio is not the only method for determining and monitoring RV dysfunction. Other methodologies for determining RV dysfunction are discussed in detail in a statement from the American Heart Association, published by Jaff et al "Challenging Forms of Venous Thromboembolic Disease": *Circulation*. 2011; 123:1788-1830 (contents incorporated by reference).

Typically, thromboembolism is treated with anticoagulant drugs. Anticoagulant therapy is effective at preventing further clotting but it does not actively lyse thrombus. Rather, thrombolysis occurs naturally i.e. through the action of endogenous plasmin, which is generated from plasminogen by natural human tissue-type tissue plasminogen activator (t-PA) and is able to dissolve the fibrin component of the thrombus. Anticoagulant therapy is a long-term treatment option, with oral anticoagulant drugs administered over several months, or even years. However, patients with the most serious types of PE may remain at an increased risk of adverse events even during anticoagulant therapy.

Advanced therapies which involve direct thrombolysis are available.

Thrombolytic agents are able to dissolve, degrade or reduce thrombus. Generally, thrombolytic agents will be plasminogen activators, a group of serine proteases, which convert plasminogen to plasmin. Plasmin dissolves the fibrin component of thrombus. One class of thrombolytic agents are recombinant tissue plasminogen activators (r-tPA), which act on plasminogen in the same way as natural tPA. Commonly used r-tPA drugs include alteplase, reteplase and tenecteplase. Activase® (Alteplase, Genentech, Inc.) is indicated for the treatment of acute massive pulmonary embolism with a recommended dose of 100 mg administered by IV infusion over 2 hours. The prescribing information for Activase carries a warning that the drug increases the risk of internal bleeding (intracranial, retroperitoneal, gastrointestinal, genitourinary, respiratory) or external bleeding, especially at arterial and venous puncture sites. Studies have shown that, in randomised clinical trials, systemic PE thrombolysis is associated with an 11.5% risk of major bleeding and a 6.3% risk of intracranial haemorrhage (Meyer, G. et al *N. Engl, J. Med.* 2014; 340: 1402-1411). For this reason, the use of large dose IV administration of tPA has declined over recent years and is currently reserved for the most seriously ill patients.

Other thrombolytic agents are available. Urokinase, which is also known as urokinase-type plasminogen activator (uPA), is a serine protease which acts in an analogous manner to r-tPA. Although urokinase dosage is measured in International Units (IU), the skilled person will understand what constitutes an equivalent dose of tPA and urokinase. For example, a typical adult dose of urokinase for systemic treatment of PE is 8800 IU/kg ideal body weight/hr administered intravenously for up to 72 hours. Urokinase is typically available in doses of 100,000 IU.

Combined ultrasound/thrombolytic therapy enables locoregional treatment of thrombus. Typically, such therapies comprise a drug delivery lumen(s) with drug delivery ports and an associated source of ultrasound, usually in the form a one or more ultrasonic transducers. The drug delivery lumen and source of ultrasound are arranged to expose thrombus to ultrasound and facilitate delivery of thrombolytic drug to the thrombus. The EkoSonic® Endovascular System (Ekos Corporation) is an example of such a combined therapy. The device comprises a drug delivery catheter that enables delivery of high frequency, low power ultrasound from the catheter core, at the same time as delivery of thrombolytic agent. The combination of ultrasound energy and thrombolytic agent accelerates thrombolysis by increasing thrombus permeability and by creating an acoustic pressure gradient to enable transport of a greater quantity of thrombolytic agent into the clot. As a result, combination therapy of this type enables more complete clot lysis in a shorter time than the therapies described above with lower doses of thrombolytic drug, which reduces the risk of major bleeding complications, including intracranial haemorrhage.

The safety and efficacy of combined ultrasound/thrombolytic therapy in PE patients was shown in two prospective, multi-center studies involving 208 subjects. ULTIMA (Kucher, N et al, *Circulation,* 2014; 129: 479-486) was a randomized-controlled study in 59 patients that showed ultrasound/thrombolytic therapy (EkoSonic® Endovascular System) to be superior to IV anticoagulant therapy (unfractionated heparin) without an increase in bleeding complications. The total dose of r-tPA used in the study was 20 mg, administered over 15 hours.

The SEATTLE II study was a prospective, multicentre trial of combined ultrasound/thrombolytic therapy involving 149 patients with acute massive and sub-massive PE. This study used 24 mg r-tPA with the EkoSonic® Endovascular System for 24 hours and showed a significant improvement in RV dysfunction with zero incidence of intracranial haemorrhage.

Although the ULTIMA and SEATTLE II studies demonstrate that combined ultrasound/thrombolytic therapy is effective with lower doses of thrombolytic agent than is used intravenously, relatively large doses (20 mg or greater) are still used. Whether administered systemically or locally, the dose of thrombolytic agent is typically infused slowly (1-2 mg/hr) and over a prolonged period of time (24-36 hours). There are two reasons for this: (i) safety—the inherent risk of bleeding with thrombolytic drugs cannot be eliminated and so, very slow infusions are used to mitigate the risk as far as possible; (ii) r-tPA has a short half-life in systemic circulation, of approximately 3-4 minutes.

Whilst combined ultrasound/thrombolytic therapy is significantly safer than intravenous administration in terms of major bleeds and intracranial haemorrhage, the risk of bleeding is still present. Treatment requires hospitalisation and, for the reasons, above, treatment is slow, with patients typically treated in the ICU followed by general ward stay for several days. This makes the procedure very time-consuming and expensive. It is desirable, therefore, to mitigate the risk of bleeding as far as possible and, at the same time, to reduce treatment times to avoid lengthy hospital stays. It is highly desirable that treatment times are reduced to a point where patients could be treated in a step-down unit and potentially even avoid the ICU.

In further clinical investigations into combined ultrasound/thrombolytic therapy, the inventor has surprisingly found that, when thrombolytic drug is administered in combination with ultrasound, improvement in circulation occurs at significantly lower doses of thrombolytic drug and at much shorter treatment times than has been observed or can be predicted from previous trials and current clinical practice. In PE population, RV function was significantly improved in even the most seriously ill patients, irrespective of the degree of clot lysis, with very small doses of thrombolytic agent administered over very short periods of time, of less than 6 hours. In particular cases, treatment times were as short as 2 hours and has the potential to be reduced to 1 hour or less. Improvements in terms of RV/LV ratios of these patients were at least as good as those observed in the earlier clinical trials which proved the safety and efficacy of combined ultrasound/thrombolytic therapy (ULTIMA, SEATTLE II), meaning that the methods of the invention provide at least as good results as currently available treatment protocols but with vastly reduced doses of thrombolytic agent and vastly reduced treatment times.

SUMMARY

The present invention provides a method for the treatment of thromboembolism and, in particular, for the treatment of pulmonary embolism, in a blood vessel comprising administering a thrombolytic agent directly to the thromboembolism in the presence of ultrasound, characterised in that total dose of thrombolytic agent administered is less than 24 mg, preferably between 1 and 24 and more preferably between 1 and 12 mg, and the time over which the total dose is delivered is less than 15 hours, preferably between 1 and 15 hours and more preferably between 1 and 6 hours. Earlier clinical studies (ULTIMA) demonstrated that thrombolysis can be achieved after 15 hours but that study required 20 mg of thrombolytic agent to observe a 23% improvement in RV dysfunction. Similarly, the SEATTLE II study exhibited a 27% improvement in RV dysfunction after administration of 24 mg of thrombolytic agent over 24 hours. Clinical studies underpinning the present invention have shown that similar or even better levels of improvement in RV dysfunction can be achieved with much smaller doses of thrombolytic agent and over much shorter treatment times.

Without being bound by theory, it is thought that the surprising clinical results show that previously unknown mechanisms occur very quickly when thrombolytic agent is administered under the influence of ultrasound. It is possible that the pulmonary vascular response to ultrasound is one which creates or activates pathways in the vasculature, which increases pulmonary blood flow, thereby relieving pressure in the right ventricle at the same time as the thrombolytic agent starts to lyse the thrombus. The current clinical studies have shown, for the first time, that RV dysfunction is improved even with a small amount of clot lysis. Improvement, as measured by RV/LV ratio, is the same or better than has been shown in previous studies despite significantly smaller doses and reduced treatment times. This is unexpected because, at the date of invention, it was thought that the levels of improvement in RV dysfunction that allow for treatment to be stopped were only seen when significant lysis had occurred. It is now thought that combined ultrasound/thrombolytic therapy utilises additional pathways, such as increased and/or extended vasodilation of capillary vessels in the pulmonary venous system, to allow for rapid treatment with low doses of thrombolytic, even if significant thrombus remains.

In particular cases, the total dose of thrombolytic agent administered is approximately 12 mg and, preferably between 1 and 12 mg, more preferably between 2 and 12 mg, more preferably between 4 and 12, more preferably between 2 and 6 mg and more preferably still between 4 and 6 mg Suitable total doses of thrombolytic therefore are 11 mg, 10 mg, 9 mg, 8 mg, 7 mg, 6 mg, 5 mg, 4 mg, 3 mg, 2 mg or 1 mg. These very small doses are advantageous because they can be administered as a bolus dose or infused over such a short time period as to be considered a bolus dose Accordingly, in a particular embodiment, the method of treatment is characterised in that these very small doses of thrombolytic agent are administered as a bolus dose in the presence of ultrasound. The ultrasound may be activated at the same time or just prior to administration of the thrombolytic agent to the site of the thrombus or alternatively the thrombus may be subjected to ultrasound therapy for a period of time, such as between 1 and 10 minutes, prior to administration of the thrombolytic agent. As the total dose of thrombolytic agent is significantly lower than has been used previously, it is preferred that it is injected directly into the thrombus or very close to the thrombus to ensure maximum uptake. The source of ultrasound can be external to the patient but it will be understood by the person skilled in the art that such an arrangement, whereby ultrasound will be absorbed by non-target tissue, may not be optimal. Preferably the source of ultrasound is provided within the same blood vessel as the thrombus and placed within the region of the thrombus i.e. directly in or adjacent the thrombus. Catheters which allow for the infusion of thrombolytic agent and which also house a source of ultrasound are well known in the art. Commercially available devices, such as the Ekosonic Endovascular System, are FDA-cleared and CE-marked and, thus, are particularly suitable for use within the method of the invention.

Alternatively, the thrombolytic agent may be infused at rates which still result in much shorter treatment times than have been reported before. Suitably, thrombolytic agent is administered at rate of between 1 mg/hr and 6 mg/hr, such as between 1 and 4 mg/hr and preferably between 1 and 3 mg/hr and even more preferably between 1 and 2 mg/hr. In a particular embodiment, the thrombolytic agent is infused at a rate of 2 mg/hour. Administration/infusion rates of 2 mg/hour are particularly useful for low to medium doses e.g. 2, 4 6 or 8 mg of thrombolytic agent which results in treatment times which are as short enough i.e. 1, 2 or 3 hours to be considered out-patient or single-day treatments.

In another particular embodiment, the thrombolytic agent is infused at rate of 1mg/hour or less. This rate may be particularly useful for the lowest doses of thrombolytic agent, such as 1, 2, 3 or 4 mg allowing for treatment times of 1, 2, 3 or 4 hours.

Infusion rates of 2 mg/hour can be useful in severe acute PE patients, for example, who may require bilateral PE treatment. In these cases, bilateral treatment can be achieved with two ultrasound/drug delivery catheters being used in the same patients to deliver two doses at the same time, for example 1, 2, 3, 4, 5, 6, 7, 8, 9, 10, 11 or 12 mg through each catheter to give a maximum total dose of 24 mg. The infusion rates are well tolerated and will result in total treatment times which are less than 6 hours, for example: bilateral treatment with 1 mg thrombolytic agent, infused at 2 mg/hour results in a total dose of 2 mg and a treatment time of 30 minutes; bilateral treatment with 4 mg thrombolytic agent, infused at 2 mg/hour results in a total dose of 8 mg and a treatment time of 2 hours; bilateral treatment with 6 mg thrombolytic agent, infused at 2 mg/hour results in a total dose of 12 mg and a treatment time of 2 hours; and bilateral treatment with 12 mg thrombolytic agent, infused at 2 mg/hour results in a total dose of 24 mg and a treatment time of 6 hours.

Accordingly in a particular embodiment, the invention provides a method for the treatment of pulmonary embolism comprising administering a thrombolytic agent directly to the pulmonary embolism in the presence of ultrasound, wherein the total dose of thrombolytic agent administered is between 1 and 24 mg, and the total dose is administered at a rate of between 1 mg/hr and 2 mg/hr.

Of course, the skilled person will understand that the actual infusion rate need not be exactly 1 or 2 mg/hour and that dosage rates can be varied provided the total dosage rate and total treatment time remain the same. For example, a 4 mg dose of thrombolytic agent may be administered at a rate of 2 mg/hour for one hour, and the remaining 2 mg administered at 1mg/hour, resulting in a total treatment time of three hours.

Although it is anticipated that doses lower than 1 mg will not be practically useful (in terms of the handling required to achieve such low doses) it is anticipated that smaller doses, such as 0.1, 0.2, 0.3, 0.4, 0.5, 0.6, 0.7, 0.8 and 0.9 mg, are therapeutically useful and could be used, for example, in the treatment of more minor thromboembolism.

At the end of the treatment (i e administration of the total dose of thrombolytic) patients may be given or may resume standard of care anticoagulant therapy to prevent growth of any remaining thrombus and/or that new thrombus does not form.

Thrombolytic agents, which are suitable for use with the method, are well known and approved for use in several territories. In a particular embodiment the thrombolytic agent is recombinant tissue plasminogen activator (r-tPA).

Ultrasound sources are also well known in the art. A suitable example of an ultrasound element for generation of ultrasound energy includes, but is not limited to, a piezoelectric ceramic oscillators. A single ultrasound source may be sufficient by preferably a plurality of ultrasound sources are utilised to give spatial and directional control over the ultrasound. A plurality of ultrasound elements can be advantageously wired individually, in parallel or in series to provide maximum flexibility and control over the ultrasound.

The inventor has found that internal ultrasound provided at a frequency of between 2-3 MHz is sufficient to obtain the advantages of the invention. The maximum pulse power of the ultrasound is preferably 50 W and is preferred that then ultrasound is provided in pulses of randomly variable waveforms, as this appears to provide useful source of ultrasound, without undue heating of surrounding tissue. As mentioned above, devices, such as the Ekosonic Endovascular System, are commercially available and can be used in the method of the invention without further modification.

According to a first aspect, there is provided a method for the treatment of thromboembolism comprising administering a thrombolytic agent directly to the thromboembolism in the presence of ultrasound, wherein the total dose of thrombolytic agent administered is between 1 and 12 mg and the time over which the total dose is delivered is less than 15 hours.

Preferably, the total dose of thrombolytic agent administered is between 1 and 10 mg. More preferably, the total dose of thrombolytic agent administered is between 2 and 6 mg. More preferably, the total dose of thrombolytic agent administered is between 2 and 4 mg. More preferably, the total dose of thrombolytic agent administered is 2 mg. More preferably, the thrombolytic agent is delivered as a bolus dose. More preferably, the thrombolytic agent is infused at a rate of 2 mg/hour. More preferably, the thrombolytic agent is infused at rate of 1 mg/hour. More preferably, the thrombolytic agent is recombinant tissue plasminogen activator (r-tPA) or urokinase. More preferably, ultrasound is provided at a frequency of between 2-3 MHz. More preferably, the maximum pulse power of the ultrasound is 50 W.

In a second aspect, the invention provides a method for the treatment of thromboembolism comprising:

providing a catheter with a fluid delivery lumen having at least one outlet and a plurality of ultrasound radiating members, said ultrasound radiating members arranged in the region of the fluid outlet and being connected to an electrical power source which is located externally to the catheter and arranged to drive the ultrasound radiating members;

positioning the catheter into or adjacent a thrombus;

activating the plurality of ultrasound radiating members; and introducing thrombolytic agent into the fluid delivery lumen such that thrombolytic agent flows through the fluid deliver lumen and through the outlet;

wherein the total dose of thrombolytic agent administered through the catheter is 12 mg or less, such as between 1 and 12 mg, and the total dose of thrombolytic agent is administered at a rate which is 2 mg/hour or less, such as between 1 and 2 mg/hr.

In this aspect, the method ensures treatment times are shortened to a maximum of 6 hours. The method may be used with single or bilateral catheter placement depending on the type and location of the thromboembolism. For example, for treatment of bilateral PE cases, two catheters may be placed at the same time, with each catheter delivering up to 12 mg of thrombolytic drug at a rate of up to 2 mg/hour so that the total dose is 24 mg but the total treatment time is 6 hours.

The method may otherwise be performed with a single catheter which delivers the total dose of drug and the ultrasound. The maximum total dose of thrombolytic agent administered through the catheter is 12 mg and the total dose of thrombolytic agent is administered at a maximum rate of 2 mg/hour, such that treatment times limited to a maximum of 6 hours. Although much smaller doses are effective, there will be a practical lower dose that can be handled routinely within a pharmacy or hospital and so, although it is unlikely that doses of less than 1 mg of thrombolytic agent would be used in a clinical setting, it is possible that smaller doses, such as 0.1, 0.2, 0.3, 0.4, 0.5, 0.6, 0.7, 0.8 and 0.9 mg, could be used for minor thromboembolism.

Preferably, the total dose of thrombolytic agent administered through the catheter is between 1 mg and 6 mg and the total dose of thrombolytic agent is administered at a rate of 1 mg/hour. More preferably, the total dose of thrombolytic agent administered through the catheter is between 2 mg and 4 mg and the total dose of thrombolytic agent is administered at a rate of 1 mg/hour. Preferably, the total dose of thrombolytic agent administered through the catheter is between 2 mg and 4 mg and the total dose of thrombolytic agent is administered at a rate of 2 mg/hour. Preferably, the thrombolytic agent is recombinant tissue plasminogen activator (r-tPA) or urokinase. Preferably, ultrasound is provided at a frequency of between 2-3 MHz. Preferably, the maximum pulse power of the ultrasound is 50 W. Preferably, the catheter is the comprises an inner core into which the ultrasound radiating members may be removal inserted and which is independent of the fluid delivery lumen, through which the thrombolytic agent is administered at 2 mg/hour to give a total treatment time which is less than 6 hours. Preferably, the total treatment time is 4 hours. Preferably, the total treatment time is 2 hours. Preferably, the thrombolytic agent is administered through 2 catheters simultaneously.

According to a further aspect, there is provided a pharmaceutical composition comprising 1-12 mg recombinant tissue plasminogen activator (r-tPA) and a pharmaceutically acceptable excipient, for use in the treatment of thromboembolism. Preferably, the composition is administered intravenously, in the presence of ultrasound and administration is completed in between 1 and 6 hours. More preferably, the composition is administered directly to the thromboembolism via a catheter which comprises a fluid delivery lumen having at least one outlet and a plurality of ultrasound radiating members, said ultrasound radiating members arranged in the region of the fluid outlet and being connected to an electrical power source which is located externally to the catheter and arranged to drive the ultrasound radiating members to produce ultrasound as the composition is administered.

According to a further aspect there is provided a thrombolytic agent for use in treatment of thromboembolism, wherein the treatment of thromboembolism comprises administering a thrombolytic agent directly to the thromboembolism in the presence of ultrasound. The total dose of thrombolytic agent administered is between 1 and 12 mg and the time over which the total dose is delivered is less than 15 hours.

Preferably, the total dose of thrombolytic agent administered is between 1 and 10 mg. More preferably, the total dose of thrombolytic agent administered is between 2 and 6 mg. More preferably, the total dose of thrombolytic agent administered is between 2 and 4 mg. Most preferably, the total dose of thrombolytic agent administered is 2 mg. Preferably, the thrombolytic agent is delivered as a bolus dose. Preferably, the thrombolytic agent is infused at a rate of 2 mg/hour. More preferably, the thrombolytic agent is infused at rate of 1 mg/hour.

Preferably, the thrombolytic agent is recombinant tissue plasminogen activator (r-tPA) or urokinase. Preferably, ultrasound is provided at a frequency of between 2-3 MHz. Preferably, the maximum pulse power of the ultrasound is 50 W.

According to a further aspect, there is provided a use of a thrombolytic agent in the preparation of a medicament for use in the treatment of thromboembolism wherein the treatment comprises administering the thrombolytic agent directly to the thromboembolism in the presence of ultrasound, wherein the total dose of thrombolytic agent administered is between 1 and 12 mg and the time over which the total dose is delivered is less than 15 hours.

Preferably, the total dose of thrombolytic agent administered is between 1 and 10 mg.

More preferably, the total dose of thrombolytic agent administered is between 2 and 6 mg. More preferably, the total dose of thrombolytic agent administered is between 2 and 4 mg. More preferably, the total dose of thrombolytic agent administered is 2 mg. More preferably, the thrombolytic agent is delivered as a bolus dose. Preferably, the thrombolytic agent is infused at a rate of 2 mg/hour. Preferably, the thrombolytic agent is infused at rate of 1 mg/hour. Preferably, the thrombolytic agent is recombinant tissue plasminogen activator (r-tPA) or urokinase. Preferably, ultrasound is provided at a frequency of between 2-3 MHz. Preferably, the maximum pulse power of the ultrasound is 50 W.

In particular examples, which are thought to be most likely to be used in routine clinical practice, the method enables a total dose of thrombolytic agent administered through the catheter of 6 mg or less and the total dose of thrombolytic agent is administered at a rate of 1 mg/hour. In another example, the total dose of thrombolytic agent administered through the catheter is 4 mg or less and the total dose of thrombolytic agent is administered at a rate of 1 mg/hour. In a further example, the total dose of thrombolytic agent administered through the catheter is 4 mg or less and the total dose of thrombolytic agent is administered at a rate of 2 mg/hour.

As has been described above the thrombolytic agent is any agent which stimulates the conversion of plasminogen to plasmin and, preferably, recombinant tissue plasminogen activator (r-tPA) or urokinase-type plasminogen activator Piezoelectric ceramic oscillators, as described above are suitable sources of ultrasound. These ultrasound elements can be shaped as a cylinder, a hollow cylinder and a disk which are concentric with the catheter. The ultrasound elements can also be an array of smaller ultrasound elements or a thin plate positioned within the body of the catheter. Similarly, a single ultrasound element can be composed of several smaller ultrasound elements.

Ultrasound may be provided in accordance with the protocols described in WO 2008/086372 (the entire contents of which were incorporated by reference and filed as an Appendix, labelled Appendix A, in U.S. Provisional Application No. 62/449,966 that was included as part of the provisional application). The disclosure of WO 2008/086372, titled "POWER PARAMETERS FOR ULTRASONIC CATHETER" and filed on Jan. 8, 2008, is hereby incorporated herein by reference in its entirety.

As expounded herein, ultrasonic energy is often used to enhance the delivery and/or effect of a therapeutic compound. For example, in the context of treating vascular occlusions, ultrasonic energy has been shown to increase enzyme mediated thrombolysis by enhancing the delivery of thrombolytic agents into a thrombus, where such agents lyse the thrombus by degrading the fibrin that forms the thrombus. The thrombolytic activity of the agent is enhanced in the presence of ultrasonic energy in the thrombus. However, it should be appreciated that the invention should not be limited to the mechanism by which the ultrasound enhances treatment unless otherwise stated. In other applications, ultrasonic energy has also been shown to enhance transfection of gene-based drugs into cells, and augment transfer of chemotherapeutic drugs into tumor cells. Ultrasonic energy delivered from within a patient's body has been found to be capable of producing non-thermal effects that increase biological tissue permeability to therapeutic compounds by up to or greater than an order of magnitude.

As used herein, the terms "ultrasonic energy", "ultrasound" and "ultrasonic" are broad terms, having their ordinary meanings, and further refer to, without limitation, mechanical energy transferred through longitudinal pressure or compression waves. Ultrasonic energy can be emitted as continuous or pulsed waves, depending on the requirements of a particular application. Additionally, ultrasonic energy can be emitted in waveforms having various shapes, such as sinusoidal waves, triangle waves, square waves, or other wave forms. Ultrasonic energy includes sound waves. In certain embodiments, the ultrasonic energy has a frequency between about 20 kHz and about 20 MHz. For example, in one embodiment, the waves have a frequency between about 500 kHz and about 20 MHz. in another embodiment, the waves have a frequency between about 1 MHz and about 3 MHz. In yet another embodiment, the waves have a frequency of about 2 MHz. The average acoustic power is between about 0.01 watts and 300 watts. In one embodiment, the average acoustic power is about 15 watts.

As used herein, the term "ultrasound radiating member" refers to any apparatus capable of producing ultrasonic energy. For example, in one embodiment, an ultrasound radiating member comprises an ultrasonic transducer, which converts electrical energy into ultrasonic energy. A suitable example of an ultrasonic transducer for generating ultrasonic energy from electrical energy includes, but is not limited to, piezoelectric ceramic oscillators. Piezoelectric ceramics typically comprise a crystalline material, such as quartz, that change shape when an electrical current is applied to the material. This change in shape, made oscillatory by an osculating driving signal, creates ultrasonic sound waves. In other embodiments, ultrasonic energy can be generated by an ultrasonic transducer that is remote from the ultrasound radiating member, and the ultrasonic energy can be transmitted, via, for example, a wire that is coupled to the ultrasound radiating member.

In a preferred embodiment, the ultrasound radiating members 40 comprise rectangular lead zirconate titanate ("PZT") ultrasound transducers that have dimensions of about 0.017 inches by about 0.010 inches by about 0.080 inches. In other embodiments, other configuration may be used. For example, discshaped ultrasound radiating members 40 can be used in other embodiments. In a preferred embodiment, the common wire 108 comprises copper, and is about 0.005 inches thick, although other electrically conductive materials and other dimensions can be used in other embodiments. Lead wires 110 are preferably 36 gauge electrical conductors, while positive contact wires 112 are preferably 42 gauge electrical conductors. However, one of ordinary skill in the art will recognize that other wire gauges can be used in other embodiments.

As described above, suitable frequencies for the ultrasound radiating member 40 include, but are not limited to, from about 20 kHz to about 20 MHz. In one embodiment, the frequency is between about 500 kHz and 20 MHz, and in another embodiment 1 MHz and 3 MHz. In yet another embodiment, the ultrasound radiating members 40 are operated with a frequency of about 2 MHz.

The ultrasound radiating members are preferably operated in a pulsed mode. For example, in one embodiment, the time average electrical power supplied to the ultrasound radiating members is between about 0.001 watts and 5 watts and can be between about 0.05 watts and 3 watts. In certain embodiments, the time average electrical power over treatment time is approximately 0.45 watts or 1.2 watts. The duty cycle is between about 0.01% and 90% and can be between about 0.1% and 50%. In certain embodiments, the duty ratio is approximately 7.5%, 15% or a variation between 1% to 30%. The pulse averaged electrical power can be between about 0.01 watts and 20 watts and can be between approximately 0.1 watts and 20 watts. In certain embodiments, the pulse averaged electrical power is approximately 4 watts, 8 watts, 16 watts, or a variation of 1 to 8 watts. As will be described above, the amplitude, pulse width, pulse repetition frequency, average acoustic pressure or any combination of these parameters can be constant or varied during each pulse or over a set of portions. In a non-linear application of acoustic parameters the above ranges can change significantly. Accordingly, the overall time average electrical power over treatment time may stay the same but not real-time average power.

In one embodiment, the pulse repetition rate is preferably between about 1 Hz and 2 kHz and more can be between about 1 Hz and 50 Hz. In certain preferred embodiments, the pulse repetition rate is approximately 30 Hz, or a variation of 10 to 40 Hz. The pulse duration or width is can be between about 0.5 millisecond and 50 milliseconds and can be between about 0.1 millisecond and 25 milliseconds. In certain embodiments, the pulse duration is approximately 2.5 milliseconds, 5 or a variation of 1 to 8 milliseconds. In addition, the average acoustic pressure can be between about 0.1 to 2 MPa or in another embodiment between about 0.5 or 0.74 to 1.7 MPa.

In one particular embodiment, the transducers are operated at an average power of approximately 0.6 watts, a duty cycle of approximately 7.5%, a pulse repetition rate of 30 Hz, a pulse average electrical power of approximately 8 watts and a pulse duration of approximately 2.5 milliseconds.

The ultrasound radiating member used with the electrical parameters described herein preferably has an acoustic efficiency than 50% and can be greater than 75%. The ultrasound radiating member can be formed a variety of shapes, such as, cylindrical (solid or hollow), flat, bar, triangular, and the like. The length of the ultrasound radiating member is preferably between about 0.1 cm and about 0.5 cm. The thickness or diameter of the ultrasound radiating members is preferably between about 0.02 cm and about 0.2 cm.

As will be described below, the ultrasound catheter includes one or more one or more ultrasound radiating members positioned therein. Such ultrasound radiating members can comprise a transducer (e.g., a PZT transducer), which is configured to convert electrically energy into ultrasonic energy. In such embodiments, the PZT transducer is excited by specific electrical parameters (herein "power parameters" or "acoustic parameters" that cause it to vibrate in a way that generates ultrasonic energy). As will be explained below, Applicants have discovered that non-linearly varying (e.g., randomly or pseudo randomly) one or more of the power parameters the effectiveness of the ultrasound catheter (e.g., the effectiveness of enhancing the removal of a thrombus) can be significantly enhanced. By non-linearly varying one or more of the power parameters the ultrasound radiating members create nonlinear acoustic pressure, which as described above can increase the effectiveness of the acoustic pressure in enhancing a therapeutic compound. In one application, the effect of nonlinearly varying acoustic pressure has been found by Applicant to enhance enzyme medicated thrombolysis by almost 1.9 times as compared to the application of substantially constant acoustic pressure. Examples of nonlinear variances include, but are not limited to, multi variable variations, variations as a function of a complex equation, sinusoidal variations, exponential variations, random variations, pseudo random variations and/or arbitrary variations. While nonlinear variance is preferred, in other arrangements it is anticipate that one or more of the parameters discussed can be varied in a linear manner either alone or combination with the nonlinear variance.

In one embodiment, one way of implementing a randomization protocol is to generate and execute a plurality of ultrasonic cycle profiles, where each ultrasonic cycle profile can have randomly generated power parameter values. As previously mentioned, power parameters include, but are not limited to, peak power, pulse width, pulse repetition frequency and pulse repetition interval. Generally, for each power parameter, a random number generator, for example, can be used to select a value within a bounded range determined by the operator. Examples of suitable ranges are described above. For example, one ultrasonic cycle profile can have a randomly selected peak power value, while the other power parameters are non-randomly selected. Another ultrasonic cycle profile may have a plurality of randomly selected power parameters values, such as peak power and pulse width. This process can be used to generate the desired number of ultrasonic cycle profiles.

Each ultrasonic cycle profile can be run for a profile execution time. For example, if the profile execution time is approximately 5 seconds, each ultrasonic cycle profile will be run for approximately 5 seconds before the next ultrasonic cycle profile is run. In some embodiments, the profile execution time is less than about 5 seconds. For example, in some embodiments the profile execution time is between about one second and about 30 seconds. In some embodiments, the profile execution time is less than about one second. In some embodiments, the profile execution time is increased so that accurate measurements can be taken of the executed power parameters. In some embodiments, the profile execution time itself can be selected randomly from a predetermined range.

In some embodiments, it is desirable to deliver a particular time averaged power. Because the power parameters may be randomized, it may take the execution of a plurality of ultrasonic cycle profiles before the time averaged power approaches an asymptotic value, in some embodiments, the execution of about 40 to 50 ultrasonic cycle profiles is required for the time averaged power to become asymptotic. In other embodiments, less than about 40 ultrasonic cycle profiles are required, while in yet other embodiments, more than about 50 ultrasonic cycle profiles are required. In some embodiments, ultrasonic cycle profiles are executed until the time average power approaches an asymptotic value. For example, if the profile execution time is 5 seconds and the overall execution time is 30 minutes, 360 ultrasonic cycle profiles will be executed, which in some embodiments is sufficient for the time average power to approach an asymptotic value.

In addition, although many embodiments have been described in the context of an intravascular catheter it should be appreciated that the non-linear application of one or more power parameters can also be applied to non-intravascular catheters or devices and/or non catheter applications. For example, the non-linear varying of one or more power parameters may also find utility in applications in which the ultrasound is applied through an external (with respect to the body or with respect to the vascular system). In particular, the discussion above can be applied to external ultrasound application in which the ultrasound source is external to the patient and/or treatment site. It is also anticipated that the methods and techniques described herein can be applied to non-vascular applications. In addition, in some embodiments, the therapeutic affects of the ultrasound can be utilized alone without a therapeutic compound.

Preferably, ultrasound is provided at a frequency of between 2-3 MHz.

Suitable catheter systems are available commercially which may be used in the method. Catheters described in U.S. Pat. No. 7,220,239 (the entire contents of which were incorporated by reference and filed as an Appendix, labelled Appendix B, in U.S. Provisional Application No. 62/449,966 that was included as part of the provisional application) are particularly suitable for administration of thrombolytic agent at a rate which is between 1 and 2 mg/hour to give treatment time which is between 1 and 6 hours. In a particular embodiment the total dose of thrombolytic agent is chosen such that the total treatment time is 4 hours. In another embodiment, the total dose of thrombolytic agent is chosen such that the total treatment time is 2 hours. The disclosure of U.S. Pat. No. 7,220,239, titled "CATHETER WITH MULTIPLE ULTRASOUND RADIATING MEMBERS" and filed on Dec. 3, 2002, is hereby incorporated herein by reference in its entirety.

In another aspect, the invention provides a pharmaceutical composition comprising 1-12 mg recombinant tissue plasminogen activator (r-tPA) and a pharmaceutically acceptable excipient, for use in the treatment of thromboembolism. As described above the thromboembolism may be Deep Vein Thrombosis (DVT), Pulmonary Embolism (PE) or Peripheral Arterial Occlusions (PAO). The composition is useful for treatment of thromboembolism using the methods described herein. The composition of the invention is particularly suitable for intravenous administration in the presence of ultrasound and where administration is completed less than 6 hours.

In a preferred embodiment, the pharmaceutical composition is administered directly to the thromboembolism via a catheter which comprises a fluid delivery lumen having at least one outlet and a plurality of ultrasound radiating members, said ultrasound radiating members arranged in the region of the fluid outlet and being connected to an electrical power source which is located externally to the catheter and arranged to drive the ultrasound radiating members to produce ultrasound as the composition is administered. Suitable catheters and ultrasound protocols are described in U.S. Pat. No. 7,220,239 and WO 2008/086372, respectively.

The invention will now be described by way of example, which is intended to describe particular embodiments of the invention. The embodiments are illustrative and not intended to limit the scope of protection of the claims Example: Optimum Duration and Dose of r-tPA with Ultrasound for Intermediate-Risk (Submassive) Pulmonary Embolism The optimum dose of thrombolytic agent and duration of the ultrasound procedure in combined ultrasound/thrombolytic therapy (described in this example as the APT Procedure) was determined for acute submassive PE. The Acoustic Pulse Thrombolysis (APT) Procedure utilised the EkoSonic® Endovascular System (Ekos Corporation) to deliver high frequency (2-3 MHz), low power ultrasound in combination with low doses of recombinant tissue plasminogen activator (r-tPA).

Materials and Methods:

Eligible subjects had acute (symptoms <14 days) proximal PE located in at least one main or proximal lobar pulmonary artery and a right ventricular (RV)-to-left ventricular (LV) end-diastolic diameter ratio ≥0.9 on chest computed tomographic angiography (CTA). Eligible subjects were required to receive treatment within 48 h of the diagnostic CTA. The primary efficacy endpoint was reduction of the RV/LV ratio by >0.2 on CTA at 48 h after starting treatment. The primary safety endpoint was major bleeding events within 72 h after initiating the procedure. Secondary endpoints included the Modified Miller Score (MMS; embolic burden on CTA).

The Ekosonic Endovascular Device was used in accordance with the published Instructions for Use. The system generates ultrasound waves in the treatment zone of the catheter through the piezoelectric conversion of radiofrequency energy. The ultrasound emanates radially from the treatment zone to improve the dispersion of infused physician-specified fluids, including thrombolytics.

The EKOS Device consists of two main components:
1. Single-use sterile device, consisting of an
   a. Intelligent Drug Delivery Catheter (IDDC)
   b. MicroSonic Device (MSD)
2. EkoSonic® Control System (reusable)

The IDDC is 5.4 French with a 106 cm or 135 cm working length. It includes two luer ports for coolant fluid and thrombolytic delivery and an electrical connector for the thermocouples that monitor the catheter system temperature. Radiopaque markers are located approximately 1 cm proximal and 1 cm distal to the treatment zone. The IDDC central lumen is compatible with a 0.035" guidewire, accepts the MSD and delivers coolant during operation. Each EkoSonic Device requires its own infusion tubing and infusion pump with coolant of normal saline to run at 35 ml/hr/device. The MSD locks to the luer connector on the central lumen of the IDDC aligning the ultrasound-generating segment to the treatment zone of the IDDC. The device uses multiple ultrasound transducers to emit ultrasound energy radially from the long axis of the catheter system.

The EkoSonic® Control System provides electrical power to the piezoelectric elements in the treatment zone of the Device and monitors operating parameters during operation. The Control System also provides the user interface through the front panel display and keypad.

The r-tPA used in this study was commercially available drug marketed in the participating geographies under various brand names for fibrinolysis of pulmonary embolism by systemic peripheral infusion. The r-tPA was prepared from standard pharmacy supplies and prepared following the manufacturer's instructions. r-tPA was be delivered through the EkoSonic® Endovascular System (ultrasonic infusion catheter) to the site of the clot rather than by systemic infusion. The drug was administered using standard infusion pumps to administer the total dose of drug at a rate of either 1 mg/hour or 2 mg/hour. Doses of r-tPA administered were 4, 6, and 12 mg through a single catheter. In some bilateral cases, total dose of r-tPA was 8, 12 or 24 mg, with a maximum treatment time of 6 hours Protocol All patients met the following criteria to be eligible for participation in this clinical trial:
1. Male or female ≥18 years of age and ≤75 years of age
2. CTA evidence of proximal PE (filling defect in at least one main or lobar pulmonary artery)
3. PE symptom duration ≤14 days
4. Submassive PE: RV/LV diameter ≥0.9 from CTA and hemodynamically stable
5. Treatment was started within 48 hours of diagnosis of PE by CTA
6. Signed Informed consent obtained from subject or Legally Authorized Representative Venous access was obtained via venipuncture of the common femoral vein (CFV) and/or internal jugular vein (IJV), under ultrasound guidance. The pulmonary artery was then catheterized, according to the treating physician's preferred techniques, for example, via the transfemoral approach is using a 5- or 6-Fr pigtail catheter in conjunction with a hydrophilic Glidewire® (Terumo, Sommerset, NJ) and torque control device or standard Telfoncoated wire using tip-deflecting techniques. A sheath was then placed into the artery or was completed prior to catheterisation.

Selective contrast injection into the main left or right PA was then undertaken to identify the largest thrombosed arterial branch(es).

Figure 2:
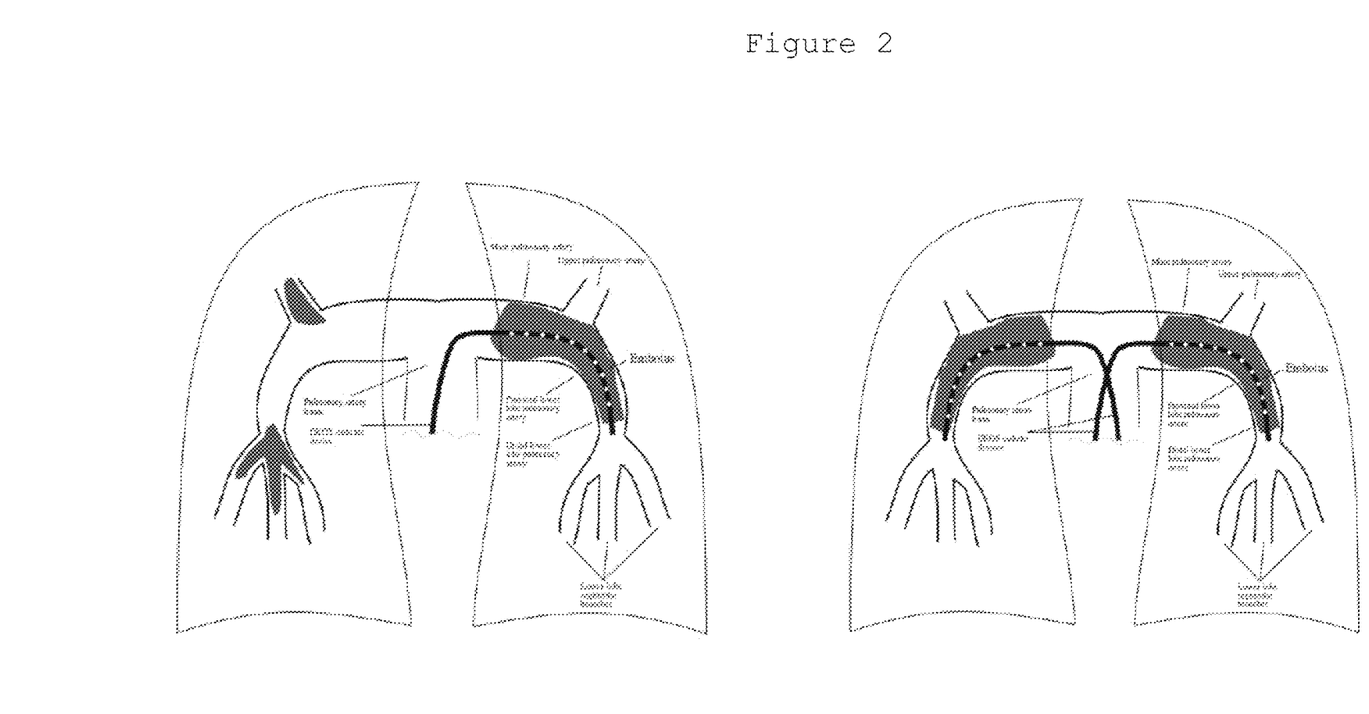
FIG. 2 illustrates a colored embodiment of a simplified model of the pulmonary arteries that illustrates the example placement of catheters for single and bilateral treatment.
Figure 2A:
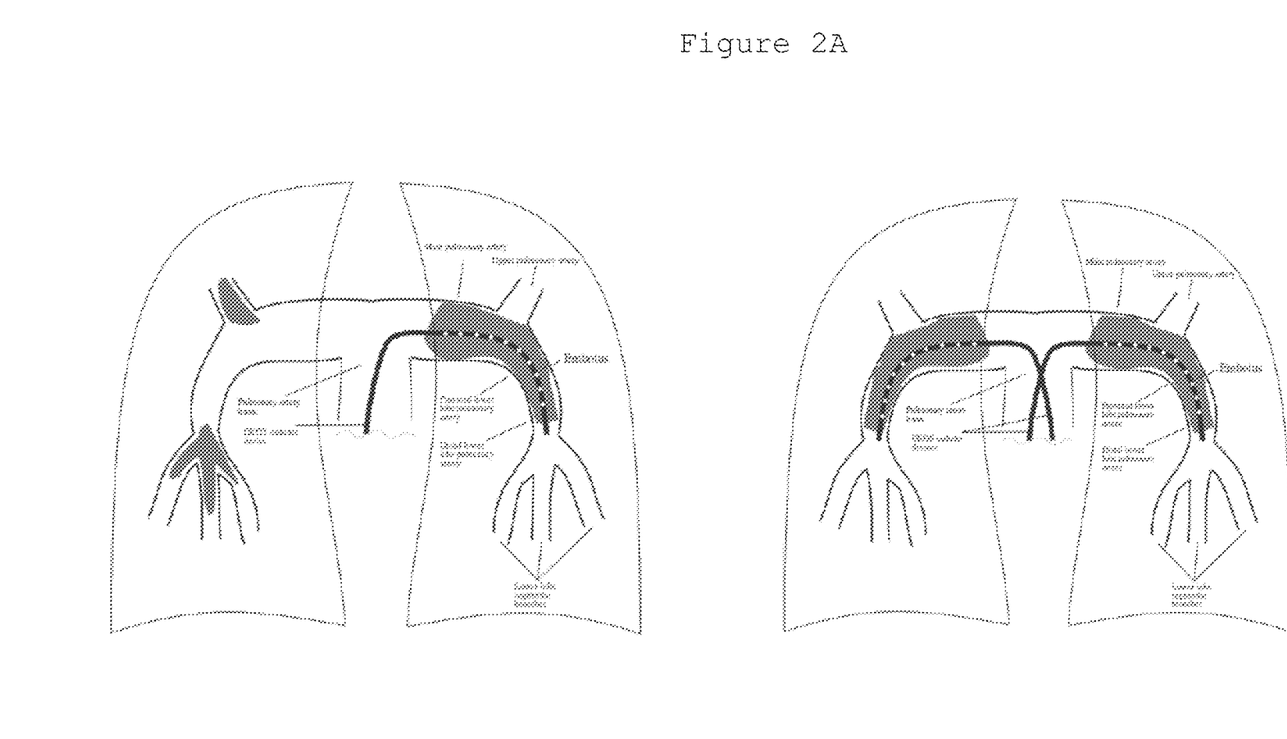
FIG. 2A illustrates a black and white version of the colored example illustrated in FIG. 2.

A simplified model of the pulmonary arteries is shown in the figures (which is included in two versions in the drawings—FIG. 2 in color and FIG. 2A in black and white) to illustrate the example placement of catheters for single and bilateral treatment (depending on the location of the thrombus). Note, that the segmental branches of the upper lobe, middle lobe, and lingula are not shown in this simplified model.

The EkoSonic Device was then prepped per protocol from the manufacturer's Instructions for Use and the infusion catheter was inserted over the respective guidewire and buried within the previously identified thrombosed artery.

Once the infusion catheters were properly positioned and connected to IV pumps, catheter directed thrombolysis was initiated using alteplase (rt-PA; Genentech, South San Francisco, Calif.). Once rtPA infusion is initiated through the catheter(s), the catheter control unit was activated for ultrasound energy transmission. Treatment continued at the protocol prescribed infusion rate and dose i.e. dose per catheter was between 4 and 12 mg and infusion rates were 1 or 2 mg/hr. Following completion of catheter-directed thrombolysis, the patient was given a follow-up CTA to measure changes, Results:

Ninety-one subjects (mean age 57.5, BMI 35.9, female 48%, Caucasian 59%) at 17 centers were enrolled and randomized to one of four Cohorts (Table 1). All received therapeutic anticoagulation in addition to the specific USCDT treatment regimen. Significant improvement was observed in RV/LV ratio at 48 h post-procedure in all Cohorts. Similarly, significant improvements occurred in the MMS, with increasing reduction from Cohort 1 to 4.

TABLE 1

| Cohort | US Duration (h) | tPA Dose (total mg; one/two catheters) | RV/LV Ratio at 48 h Mean Change (%); p value*; N | MMS Mean % change; p value**; N | Major Bleeding # (%) Pts; N |
|---|---|---|---|---|---|
| 1 | 2 | 4/8 mg | −0.46 (27); 0.006; 19 | −5%; 0.013; 19 | 0 (0); 23 |
| 2 | 4 | 4/8 mg | −0.34 (22); 0.013; 22 | −7%; 0.0003; 22 | 1 (4); 25 |
| 3 | 6 | 6/12 mg | −0.47 (28); 0.0004; 22 | −15%; 0.00001; 21 | 0 (0); 25 |
| 4 | 6 | 12/24 mg | −0.48 (26); 0.018; 18 | −26%; 0.0007; 18 | 2 (11); 18 |

*1-sided p-value comparing to a ≤0.20 decrease;
**1-sided p value comparing to 0 decrease The overall major bleeding rate was 3/91 (3%). No major bleeding events were reported in Cohorts 1 and 3. The major bleeding event in Cohort 2 was anemia secondary to facial trauma after syncope. The major bleeding events in Cohort 4 were bleeding from a splenic pseudoaneurysm treated with coil embolization, and ICH in a 75 year-old male patient with a prior history of thrombocytopenia and labile hypertension. Another major bleeding event of ICH was reported following systemic administration of tPA 50 mg; the subject recovered completely.

Two Patient Populations for Analysis: Efficacy (N=81) and Safety (N=91).

Difference are the number of evaluable patients (Pre and post treatment CTs)—see Tables 2 and 3

TABLE 2

Demographics Safety

| | N | Mean | StdDev | Median | Min | Max |
|---|---|---|---|---|---|---|
| Age | 91 | 57.5 | 12.9 | 59.9 | 28.9 | 77.5 |
| Weight (lbs) | 91 | 237.0 | 67.3 | 226.0 | 110.0 | 498.0 |
| BMI (kg/m2) | 91 | 35.9 | 10.5 | 33.3 | 18.2 | 75.5 |

| | N | Percent |
|---|---|---|
| Gender | | |
| Female | 44 | 48% |
| Male | 47 | 52% |
| Ethnicity | | |
| Hispanic | 4 | 4% |
| Not Hispanic | 87 | 96% |
| Race | | |
| Caucasian, Not of Hispanic Origin | 54 | 59.3% |
| African American, Not of Hispanic Origin | 33 | 36.3% |
| Hispanic or Latino | 2 | 2.2% |
| Asian or Pacific Islander | 1 | 1.1% |
| Other* | 1 | 1.1% |

TABLE 3

Demographics Efficacy (N = 81) No meaningful difference from Safety

| | N | Mean | StdDev | Median | Min | Max |
|---|---|---|---|---|---|---|
| Age | 81 | 57.2 | 13.1 | 59.6 | 28.9 | 77.5 |
| Weight (lbs) | 81 | 242.0 | 66.4 | 230.0 | 113.0 | 498.0 |
| BMI (kg/m2) | 81 | 36.7 | 10.6 | 34.8 | 18.2 | 75.5 |

TABLE 3-continued

Demographics Efficacy (N = 81) No meaningful difference from Safety

| | N | Percent |
|---|---|---|
| Gender | | |
| Female | 38 | 47% |
| Male | 43 | 53% |
| Ethnicity | | |
| Hispanic | 3 | 4% |
| Not Hispanic | 78 | 96% |
| Race | | |
| Caucasian, Not of Hispanic Origin | 51 | 63.0% |

TABLE 4

RV/LV Raw Data

| | N | Mean | StdDev | Median | Min | Max | 95% Confidence Interval | | p-value* | p-value** |
|---|---|---|---|---|---|---|---|---|---|---|
| Arm 1: APT/2 hours - r-tPA/2 mg/hr/catheter | | | | | | | | | | |
| RV/LV Ratio at Baseline | 19 | 1.53 | 0.40 | 1.48 | 0.98 | 2.69 | | | | |
| RV/LV Ratio Post-Procedure | 19 | 1.07 | 0.16 | 1.04 | 0.80 | 1.33 | | | | |
| Post-Procedure - Baseline | 19 | −0.46 | 0.40 | −0.33 | −1.70 | 0.05 | −0.65 | −0.27 | 0.000048 | 0.006 |
| Percent Change | 19 | −27% | 17% | −26% | −63% | 4% | | | | |
| Arm 2: APT/4 hours - r-tPA/1 mg/hr/catheter | | | | | | | | | | |
| RV/LV Ratio at Baseline | 22 | 1.42 | 0.33 | 1.36 | 0.97 | 2.34 | | | | |
| RV/LV Ratio Post-Procedure | 22 | 1.09 | 0.18 | 1.08 | 0.76 | 1.43 | | | | |
| Post-Procedure - Baseline | 22 | −0.34 | 0.27 | −0.32 | −0.91 | 0.08 | −0.45 | −0.22 | 0.000004 | 0.013 |
| Percent Change | 22 | −22% | 14% | −24% | −46% | 7% | | | | |
| Arm 3: APT/6 hours - r-tPA/1 mg/hr/catheter | | | | | | | | | | |
| RV/LV Ratio at Baseline | 22 | 1.51 | 0.37 | 1.41 | 0.97 | 2.26 | | | | |
| RV/LV Ratio Post-Procedure | 22 | 1.04 | 0.19 | 1.04 | 0.66 | 1.50 | | | | |
| Post-Procedure - Baseline | 22 | −0.47 | 0.32 | −0.38 | −1.19 | 0.02 | −0.61 | −0.33 | 0.0000004 | 0.0004 |
| Percent Change | 22 | −28% | 16% | −29% | −56% | 2% | | | | |
| Arm 4: APT/6 hours - r-tPA/2 mg/hr/catheter | | | | | | | | | | |
| RV/LV Ratio at Baseline | 18 | 1.51 | 0.58 | 1.34 | 0.83 | 3.02 | | | | |
| RV/LV Ratio Post-Procedure | 18 | 1.03 | 0.24 | 0.96 | 0.79 | 1.74 | | | | |
| Post-Procedure - Baseline | 18 | −0.48 | 0.51 | −0.49 | −1.65 | 0.15 | −0.73 | −0.22 | 0.001 | 0.018 |
| Percent Change | 18 | −26% | 23% | −31% | −66% | 14% | | | | |

*1-sided t-test comparing to 0
**1-sided t-test comparing to a 0.20 decrease

The invention claimed is:

1. A method for a treatment of a thromboembolism comprising administering to a human subject a thrombolytic agent directly to the thromboembolism in a presence of ultrasound, wherein a total dose of the thrombolytic agent administered is between 2 and 6 mg and the total dose of thrombolytic agent is delivered over a period of time, wherein the period of time is a minimum of 30 minutes and a maximum of 6 hours.

2. The method according to claim 1 wherein the total dose of the thrombolytic agent administered is between 2 and 4 mg.

3. The method according to claim 1 wherein the total dose of the thrombolytic agent administered is 2 mg.

4. The method according to claim 1 wherein the thrombolytic agent is infused at a rate of 2 mg/hour.

5. The method according to claim 1 wherein the thrombolytic agent is recombinant tissue plasminogen activator (r-tPA) or urokinase.

6. The method according to claim 1 wherein the ultrasound is provided at a frequency of between 2-3 MHz.

7. The method according to claim 6 wherein a maximum pulse power of the ultrasound is 50 W.

8. The method according to claim 1 further comprising:
providing a catheter with a fluid delivery lumen having at least one outlet and a plurality of ultrasound radiating members, said ultrasound radiating members arranged in a region of the fluid outlet and being connected to an electrical power source which is located externally to the catheter and arranged to drive the ultrasound radiating members;
positioning the catheter into or adjacent the thromboembolism;
activating the plurality of ultrasound radiating members to produce ultrasound; and
introducing the thrombolytic agent into the fluid delivery lumen such that the thrombolytic agent flows through the fluid deliver lumen and through the outlet;
wherein the total dose of the thrombolytic agent is administered through the catheter and the total dose of the thrombolytic agent is administered at a rate of between 1 mg/hour and 2 mg/hour.

9. The method according to claim 8 wherein the total dose of thrombolytic agent administered through the catheter is between 1 mg and 6 mg and the total dose of thrombolytic agent is administered at a rate of 1 mg/hour.

10. The method according to claim 8 wherein the total dose of thrombolytic agent administered through the catheter is between 2 mg and 4 mg and the total dose of thrombolytic agent is administered at a rate of 1 mg/hour.

11. The method according to claim 8 wherein the total dose of thrombolytic agent administered through the catheter is between 2 mg and 4 mg and the total dose of thrombolytic agent is administered at a rate of 2 mg/hour.

12. The method according to claim 8 wherein the thrombolytic agent is recombinant tissue plasminogen activator (r-tPA) or urokinase.

13. The method according to claim 8 wherein the ultrasound is provided at a frequency of between 2-3 MHz.

14. The method according to claim 8 wherein a maximum pulse power of the ultrasound is 50 W.

15. The method according to claim 8 wherein the catheter comprises an inner core into which the ultrasound radiating members may be inserted and which is independent of the fluid delivery lumen, through which the thrombolytic agent is administered at 2 mg/hour to give a total treatment time which is less than 6 hours.

16. The method according to claim 15 wherein the total treatment time is 4 hours.

17. The method according to claim 15 wherein the total treatment time is 2 hours.

18. The method according to claim 8 wherein the thrombolytic agent is administered through 2 catheters simultaneously.

19. The method according to claim 1, wherein the thrombolytic agent is delivered at a constant rate for at least a first hour of the period of time.

20. A method for a treatment of a thromboembolism comprising administering to a human subject a thrombolytic agent directly to the thromboembolism in a presence of ultrasound, wherein a total dose of the thrombolytic agent administered is between 1 and 12 mg and the total dose of thrombolytic agent is delivered over a period of time, wherein the period of time is a minimum of 30 minutes and a maximum of 6 hours; and wherein the thrombolytic agent is infused at rate of 1 mg/hour.

* * * * *